(12) United States Patent
Kvachnev

(10) Patent No.: US 11,788,541 B2
(45) Date of Patent: Oct. 17, 2023

(54) HIGH PRESSURE GAS SEALING

(71) Applicant: Dover Pumps & Process Solutions Segment, Inc., Downers Grove, IL (US)

(72) Inventor: Vitali Kvachnev, Pearland, TX (US)

(73) Assignee: Dover Pumps & Process Solutions Segment, Inc., Downers Grove, IL (US)

(*) Notice: Subject to any disclaimer, the term of this patent is extended or adjusted under 35 U.S.C. 154(b) by 0 days.

(21) Appl. No.: 17/323,198

(22) Filed: May 18, 2021

(65) Prior Publication Data
US 2021/0355954 A1 Nov. 18, 2021

Related U.S. Application Data

(60) Provisional application No. 63/026,219, filed on May 18, 2020.

(51) Int. Cl.
*F16J 15/447* (2006.01)
*F04D 29/10* (2006.01)
*F16J 15/34* (2006.01)

(52) U.S. Cl.
CPC ........ *F04D 29/104* (2013.01); *F16J 15/3484* (2013.01); *F16J 15/4474* (2013.01); *F05D 2240/55* (2013.01)

(58) Field of Classification Search
CPC .. F16J 15/3484; F16J 15/4474; F04D 29/104; F05D 2240/55
See application file for complete search history.

(56) References Cited

U.S. PATENT DOCUMENTS

| 2,172,141 A | 9/1939 | King |
| 3,076,659 A | 2/1963 | Kremer, Jr. |

(Continued)

FOREIGN PATENT DOCUMENTS

| CN | 101832248 A | 9/2010 |
| CN | 112049939 | 12/2020 |

(Continued)

OTHER PUBLICATIONS

International Search Report and Written Opinion in International Appln. No. PCT/US2021/032937, dated Sep. 15, 2021, 10 pages.

(Continued)

*Primary Examiner* — Gilbert Y Lee
(74) *Attorney, Agent, or Firm* — Fish & Richardson P.C.

(57) ABSTRACT

A gas processing system includes a vessel defining a cavity for processing a gas. The vessel includes a process gas inlet for accepting process gas at an input pressure, and a process gas outlet for discharging process gas at an output pressure. The gas processing system further includes a shaft coupled to the vessel and a multistage sealing system comprising multiple seals spaced along the shaft. The shaft is configured to transfer mechanical energy to or from gas in the vessel. Each adjacent pair of seals defines a corresponding pressure space therebetween. One of the pressure spaces is an equalizing pressure space in hydraulic communication with the process gas inlet via a flow line, such that in operation, pressure in the equalizing pressure space is maintained at an equalized pressure with respect to a pressure in the process gas inlet.

21 Claims, 6 Drawing Sheets

(56) References Cited

U.S. PATENT DOCUMENTS

| | | | |
|---|---|---|---|
| 3,386,346 A | 6/1968 | Halpin | |
| 3,542,374 A | 11/1970 | Neilson et al. | |
| 3,544,118 A | 12/1970 | Klein | |
| 3,658,348 A | 4/1972 | Nink | |
| 3,687,577 A | 8/1972 | Henry et al. | |
| 3,698,726 A | 10/1972 | Schettler | |
| 3,711,104 A | 1/1973 | Henry | |
| 3,756,611 A | 9/1973 | Wikelski et al. | |
| 3,945,649 A * | 3/1976 | Nakamura | F16J 15/26 277/417 |
| 4,222,575 A | 9/1980 | Sekiguchi et al. | |
| 4,329,126 A | 5/1982 | Nishimura | |
| 6,286,837 B1 | 9/2001 | Humphrey | |
| 6,932,351 B1 * | 8/2005 | Mowll | F04B 39/0022 277/517 |
| 7,255,136 B2 | 8/2007 | Templet et al. | |
| 8,061,984 B2 | 11/2011 | Kuzdzal et al. | |
| 8,156,856 B2 | 4/2012 | Abe | |
| 8,540,479 B2 * | 9/2013 | Awtar | F01D 11/22 415/113 |
| 9,217,508 B2 | 12/2015 | Quarmby et al. | |
| 9,488,187 B2 | 11/2016 | Bardon et al. | |
| 10,273,952 B2 | 4/2019 | Trevino et al. | |
| 2002/0085937 A1 | 7/2002 | Gennami et al. | |
| 2005/0206087 A1 | 9/2005 | Hogg et al. | |
| 2005/0206090 A1 | 9/2005 | Bunn | |
| 2017/0321697 A1 | 11/2017 | Beinert et al. | |
| 2017/0335966 A1 * | 11/2017 | Werdecker | F04D 29/124 |
| 2020/0072229 A1 | 3/2020 | Kjellnes et al. | |
| 2022/0389922 A1 | 12/2022 | Martin et al. | |

FOREIGN PATENT DOCUMENTS

| | | |
|---|---|---|
| EP | 1805437 | 7/2007 |
| JP | S59222673 | 12/1984 |
| JP | 2017089595 | 5/2017 |
| RU | 2082488 | 6/1997 |
| WO | WO 2006/042866 | 4/2006 |
| WO | WO 2020/157141 | 8/2020 |

OTHER PUBLICATIONS

International Preliminary Report on Patentability in International Appln. No. PCT/US2021/032937, dated Jun. 23, 2022, 15 pages.
International Search Report and Written Opinion in International Appln. No. PCT/US2022/072822, dated Sep. 16, 2022, 13 pages.
Vetter et al., "Investigation of the operational behaviour of dry-running piston-rod sealing systems in crosshead compressors," Reliability and economics of compression systems—recent trends in the market of reciprocating compressors, Vienna, Austria, Mar. 27-28, 2003; Proceedings of the 3rd EFRC Conference, 2003, pp. 11-21.

* cited by examiner

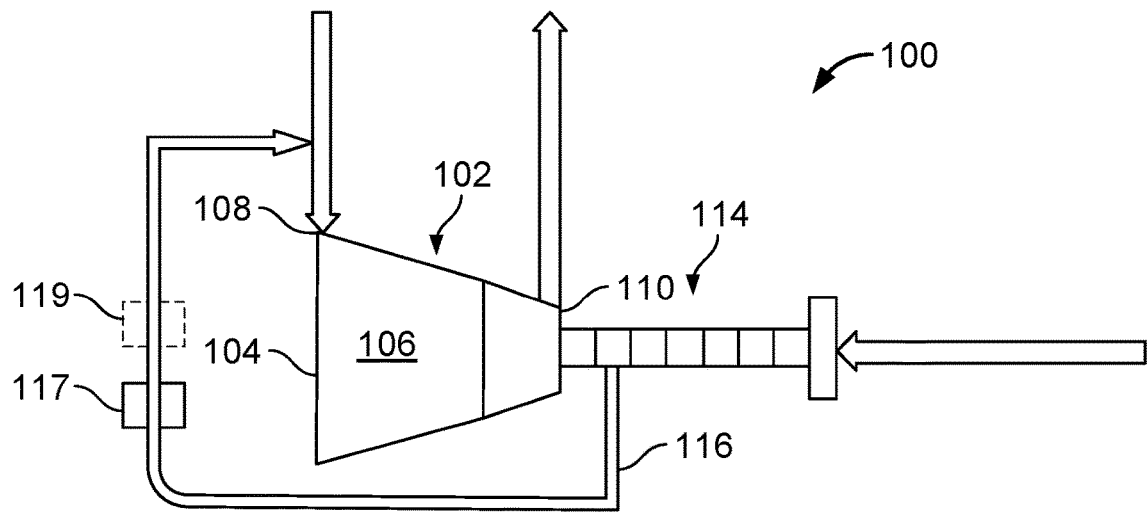
FIG. 1
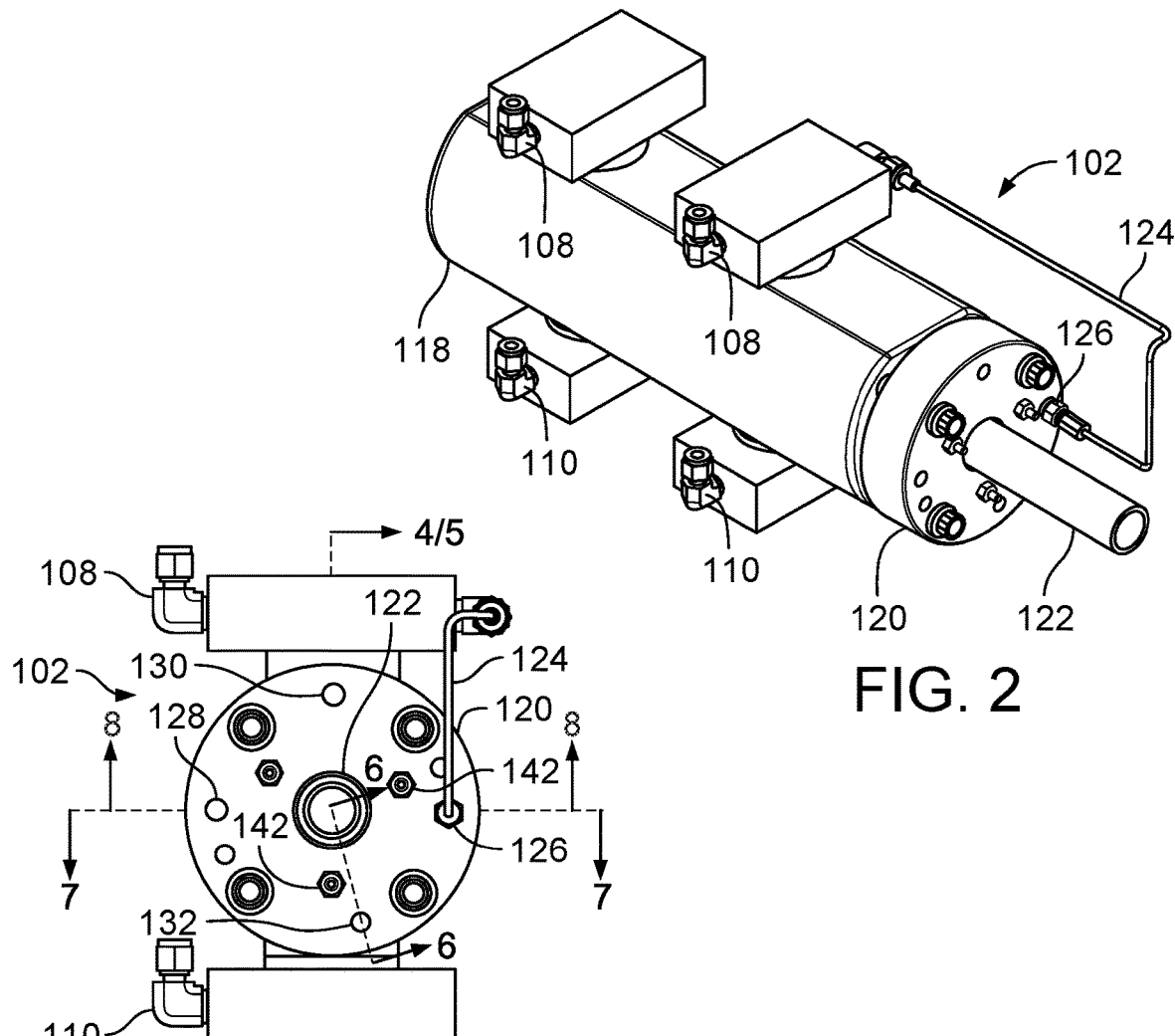
FIG. 2
FIG. 3

HIGH PRESSURE GAS SEALING

CROSS-REFERENCE TO RELATED APPLICATION

This application claims priority under 35 U.S.C. § 119 to U.S. Application Ser. No. 63/026,219, filed on May 18, 2020, and entitled "High Pressure Gas Sealing," the entire contents of which is incorporated by reference herein.

TECHNICAL FIELD

This invention relates to sealing shafts of high pressure gas processing equipment such as compressors, particularly with progressive sealing systems.

BACKGROUND

Progressive or multistage sealing systems are commonly employed when high differential pressures are to be maintained, such as between atmosphere and a high pressure cavity into which a moving shaft extends. Effective, reliable sealing often requires a sealing system in which pressure is reduced along the shaft in stages, or progressively along a labyrinth. The compression industry strives to increase maximum allowable working pressure and system speed as required by heightened customer specifications. However, increasing differential pressure typically makes it more difficult to contain gas within the system and can also apply more stress on associated sealing elements, thereby increasing pressure pulsation within the system, consumption of lubrication oil, and undesired emission of gas to the atmosphere.

SUMMARY

One aspect of the invention features a gas processing system with a vessel defining a cavity for processing a gas and having a process gas inlet for accepting process gas at an input pressure, and a process gas outlet for discharging process gas at an output pressure. A shaft is coupled to the vessel and configured to transfer mechanical energy to or from gas in the vessel. The system has a progressive sealing system that defines an intermediate pressure space between adjacent seals spaced along the shaft between the cavity and atmosphere. The maximum pressure in the intermediate pressure space is lower than a greater of the input pressure and the output pressure, and higher than atmospheric pressure. By 'progressive' I mean that the sealing system has multiple sealing members between a high pressure point and a low pressure point. In many cases, such systems progressively reduce the pressure in stages between the high and low pressure points. Notably, the intermediate pressure space can be in hydraulic communication with the process gas inlet via a flow line spaced from the shaft. By 'hydraulic' I do not mean to imply that a liquid is involved.

In some cases, such as in a gas compressor system, the output pressure is greater than the input pressure.

In some examples, the sealing system defines multiple pressure spaces between adjacent seals spaced along the shaft, including the intermediate pressure space and a second space that in operation reaches a maximum pressure lower than a maximum pressure in the intermediate pressure space and higher than atmospheric pressure.

Some embodiments also have a purge gas source in hydraulic communication with the second pressure space and under sufficient pressure to cause purge gas to flow from the purge gas source into the sealing system and along the shaft away from the vessel. The multiple pressure spaces may include a vent pressure space, for example, in hydraulic communication with a vent for venting at least some of the purge gas.

In some example, the sealing system has a series of four seals defining three pressure spaces. Some examples have an even greater number of seals bounding discrete pressure spaces. The multiple pressure spaces may include a pressure space in hydraulic communication with a pressurized source of lubricant.

In some embodiments, the intermediate pressure space is in direct hydraulic communication with the process gas inlet. By 'direct' I mean that there are no system components actively working on the process gas between the flow path and the compressor inlet, by doing work on the gas or removing work from the gas.

Preferably for many applications, pressure in the intermediate pressure space is maintained within 30 percent of the input pressure.

In many applications, the flow line is the only inlet or outlet into or out of the intermediate pressure space in operation, other than along the shaft surface.

In some embodiments, the vessel comprises a cylinder in which the shaft reciprocates, the shaft reciprocating within the sealing system. For example, vessel may be a compressor cylinder.

In some other embodiments, the shaft rotates with respect to the vessel during transfer of energy between the shaft and process gas within the vessel, the shaft rotating within the sealing system. In some such embodiments, the adjacent seals are adjacent portions of a continuous labyrinth seal, the intermediate pressure space being an intermediate portion of a labyrinth flow path through the seal.

In some examples, the flow path defines a throttling orifice that may be adjustable and/or controllable to affect flow along the flow path.

In some cases, the flow path includes a one-way valve that restricts flow along the flow path toward the intermediate pressure space, such as to inhibit flow of process gas into the sealing system from the inlet.

In some embodiments, each of the seals is mounted in a respective one of a plurality of seal housings coupled together along the shaft. The flow line may be defined in part by aligned apertures in multiple seal housings.

In some embodiments the vessel, shaft and sealing system are components of a first gas processing stage, the gas processing system further including a second gas processing stage having a second vessel, a second shaft and a second multistage sealing system. The first and second gas processing stages are connected such that the output of the first gas processing stage is connected to an input of the second gas processing stage. The second multistage sealing system defines a second intermediate pressure space in hydraulic communication with the process gas inlet of the vessel of the first gas processing stage via a second flow line.

Another aspect of the invention features a method of modifying a progressive sealing system having a series of seals held in a stack of seal housings aligned to accept a shaft therethrough. The method includes placing a port housing against a distal face of the stack of seal housings, the port defining a central aperture sized to accommodate the shaft, and a port in hydraulic communication with the central aperture. The port housing also accommodates an end seal configured to restrict flow along the shaft with the sealing system installed, with the end seal and a nearest one of the seals of the series of seals defining therebetween an intermediate pressure space in hydraulic communication with the port. During installation to a vessel of a gas processing system, the port is connected to an inlet of the gas processing system by a flow line.

In some embodiments, the port housing has two separable housing portions, including a first portion defining the central aperture and a second portion containing the end seal.

In some cases, the end seal is a labyrinth seal.

Another aspect of the invention features a method of sealing a shaft of a gas processing vessel having an outlet and an inlet operating at differing pressures. The method includes positioning multiple seals along the shaft, the seals defining at least one intermediate pressure space between adjacent seals; and during operation of the gas processing vessel, routing process gas leaked from the vessel into the intermediate pressure space directly back to an inlet of the gas processing vessel, the routed process gas flowing as a result of a pressure differential between the intermediate pressure space and the vessel inlet.

The invention has particular utility in the context of a gas processing system with a high pressure vessel, such as a compressor, having a shaft and a multi-stage shaft sealing system. In many examples the invention features the recirculation of process gas leaked past at least one of the seals to a process gas inlet of the vessel. This internal recirculation of leaked process gas can effectively reduce pressure between various seals, and pressure differential across seals. The reduction in pressure differential can reduce contact pressure and heat generation at the seals, while providing a cooling effect along the sealing system by the expansion of gas. The improvements disclosed herein can also extend seal life and reduce pressure pulsation and the loss of process gas, as well as the consumption of lubricating oil.

The details of one or more embodiments of the subject matter of this disclosure are set forth in the accompanying drawings and the description. Other features, aspects, and advantages of the subject matter will become apparent from the description, the drawings, and the claims.

BRIEF DESCRIPTION OF DRAWINGS

FIG. 1 schematically represents a single stage gas processing system with a multistage sealing system.

FIG. 2 is a perspective view of a portion of a reciprocating shaft compressor.

FIG. 3 is an end view of the compressor portion of FIG. 2.

Like reference numbers in different figures indicate similar elements.

DETAILED DESCRIPTION

Figure 4:
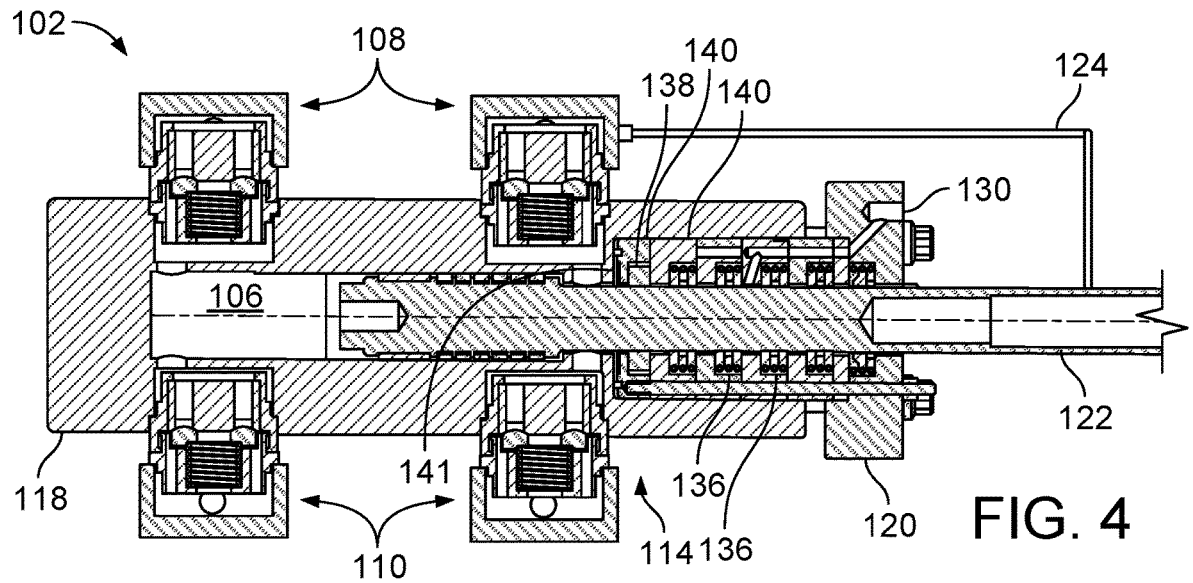
FIGS. 4 and 5 are cross-sectional views, both taken along line 4/5-4/5 in FIG. 3, showing the shaft at opposite ends of its stroke.

Referring first to FIG. 1, gas processing system 100 includes a compressor 102 having a vessel 104 defining a cavity 106 with a process gas inlet 108 and a process gas outlet 110. Compressor 102 may be, for example, a positive displacement compressor (e.g., a rotary compressor such as a lobe compressor, screw compressor, scroll compressor or vane compressor, or a reciprocating compressor such as double acting compressor) or a dynamic compressor (e.g., a centrifugal or axial compressor). Vessel 104, configured to contain process gas, is operatively coupled to a shaft that extends into the compressor. A multistage sealing system 114, represented here by a series of boxes along the shaft, inhibits process gas leakage along the shaft. The shaft transfers mechanical energy to process gas in vessel 104 (e.g., by rotating about, or translating along, its longitudinal axis), and extends through multistage sealing system 114 into cavity 106. In one example, the shaft drives a compressor wheel inside vessel 104 to substantially increase pressure at outlet 110 with respect to the pressure at inlet 108. For example, process gas may enter process gas inlet 108 at a pressure of about 800 psig, and be discharged via process gas outlet 110 at a pressure of about 1500 psig. Preferably, the compression ratio of the compressor is at least 1.5:1. As shown, a flow path 116 ports leaked process gas from between two seals of multistage sealing system 114 to the flow of gas entering inlet 108. As shown, the flow path 116 connects directly to the compressor inlet. Directly, in this context, means that there are no system components actively working on the process gas between the flow path and the compressor inlet, by doing work on the gas or removing work from the gas. Flow path 116 may include a throttling orifice 117, which may be fixed, adjustable or actively controllable, to optimize the flow along path 116 for particular operating conditions. For some applications, a oneway check valve 119 may be provided along the flow path, to prevent flow from the inlet 108 to the sealing system.

Referring next to FIG. 2, a cylinder of compressor 102 has a housing 118 and an end plate 120 that bolts to the housing and through which shaft 122 extends. Compressor cylinder 102 is of a linear reciprocating compressor with two inlets 108 and two outlets 110. A conduit 124 forms part of the flow path (116 of FIG. 1) feeding leaked process gas back to one of the two inlets.

As shown in FIG. 3, this particular end plate 120 has four ports that communicate with the multistage sealing system of the compressor. These include a pressure equalization port 126, a purge gas port 128, a lube port 130 and a vent port 132. In some examples there are fewer or more ports.

Figure 5:
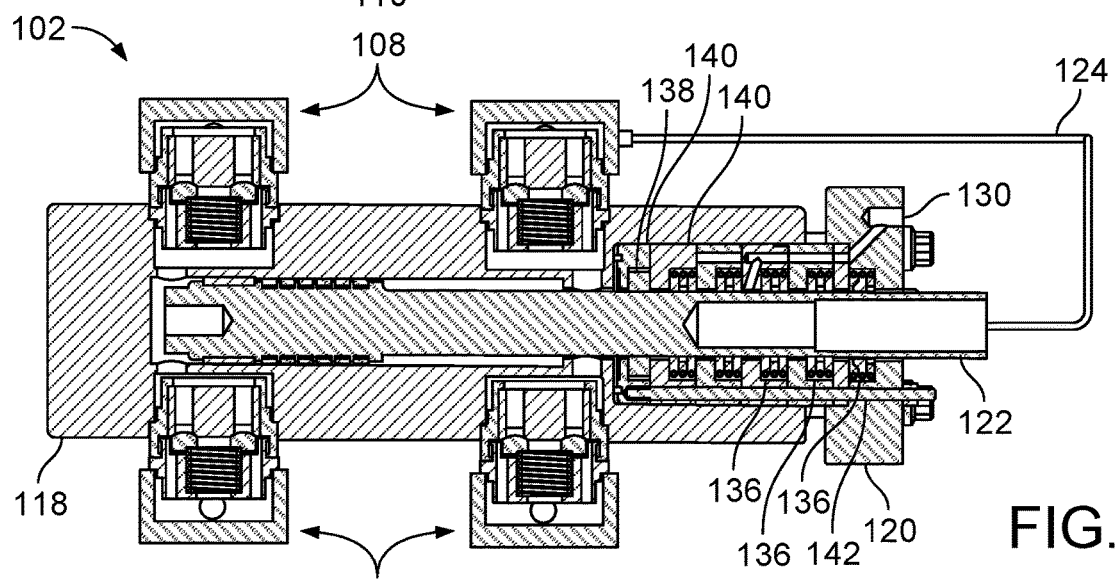

Referring next to FIGS. 4 and 5, multistage sealing system 114 is disposed about shaft 122 and in this example includes five seals 136 spaced along the shaft, and a pressure breaking rod ring 138. Each seal may include multiple sealing elements or rod rings stacked close together on the shaft, to form a tight series of sealing interfaces with the shaft. Rod ring 138 is a single element seal forming the first seal of the multistage sealing system and controls leakage to regulate backflow into the cylinder during the suction stroke and to avoid damaging rings and disengaging them from the rod. Pressure breakers also reduce gas flow out of the cylinder on the discharge stroke. Rod ring 138 may be modified to provide an optimal effective orifice in relation to the flow expected to be returned from behind the rod ring to the inlet, as discussed below. The term 'seal' does not imply that there is zero clearance at the shaft surface, or that there is no leakage across the seal. As will be understood by those working in the field of high pressure gas machinery, some leakage will be expected past high pressure differential seals, and may even be necessary to avoid high friction and premature seal failure. Expansion of gas between the seals and shaft surface can create a beneficial cooling of the shaft, resulting in lower seal wear.

Compressor cylinder inlets 108 and outlets 110 each feature a one-way valve that allows flow either into (inlet) or out of (outlet) the compressor cylinder, while inhibiting flow in the opposite direction. Each valve may have multiple flow apertures in parallel. The inlets and outlets operate in pairs, each pair operating in a respective stroke direction of the shaft. For example, during the stroke of the piston from right to left there will be an opening of the right inlet 108 and the left outlet 110, at different points during the stroke. Similarly, during the return stroke from left to right there will be an opening of the left inlet 108 and the right outlet 110 and different points during the stroke, while the right inlet and left outlet remain closed. During this return stroke from left to right, the seal end of the cylinder will be subjected to a rise of pressure to at least the outlet pressure of the compressor. This high pressure will be progressively reduced along the shaft through various stages, beginning with pressure breaking rod ring 138. During the stroke from right to left, the instantaneous pressure at the pressure breaking rod ring will at times be below the compressor inlet or suction pressure, and flow in conduit 124 may be in the opposite direction, toward the sealing system. Thus, not only does the sealing system need to withstand high pressures it must also accommodate extreme pressure waves or cycles that may fluctuate very rapidly.

Figure 6:
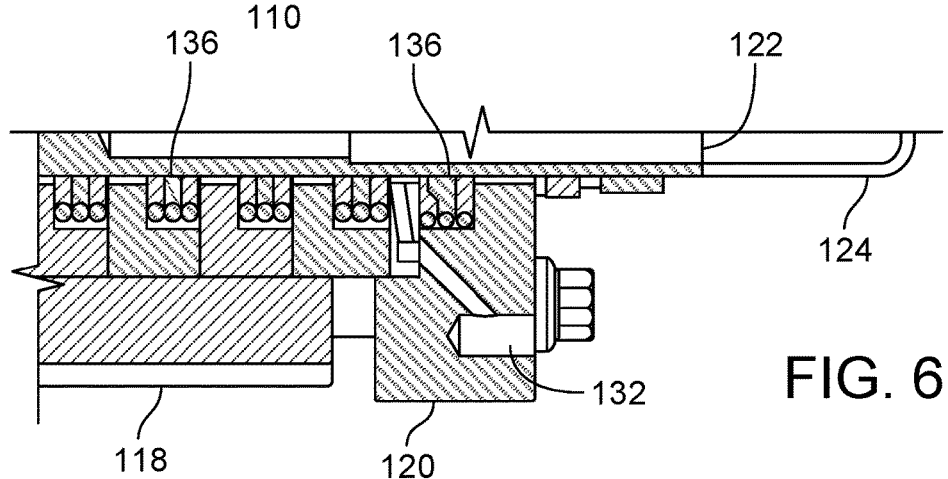
FIG. 6 is a partial cross-sectional view, taken along line 6-6 in FIG. 3.

As shown in these cross-sections, the multistage sealing system comprises multiple seal housings 140 stacked along the shaft and disposed within a bore of housing 118. The innermost seal housing is sealed against a face of the cylinder housing by a nose gasket 141. In some cases housing 118 is in two pieces, with a cast iron piece forming the main cylinder and a steel bulkhead bolted to the end of the cylinder to contain the sealing system. Each seal housing 140 contains a respective seal 136, with the outermost seal (a dual acting ring) contained within end plate 120. As understood in this art, each seal 136 may be a stack of multiple elements, such as a seal ring sandwiched between two other rings that support the sealing function. The seal housings are all connected axially to end plate 120 by tie rods 142 threaded into the distal seal housing containing the pressure breaking rod ring, to hold the stack of seal housings together for transport and assembly. Tie rods 142 may also provide an alignment function. The seal housings have aligned passages that connect the ports of the end plate with specific spaces between the seals. For example, these cross-sections show that lube port 130 is in communication with the space between the second and third seals along the shaft, such that lubricating oil introduced through port 130 reaches the shaft surface between those two seals and lubricates at least some of the sealing interfaces of the sealing system. It will be noted that there is a blind passage in the third seal housing from the left that is not in communication with the lube port. It serves no purpose but is a result of using the same seal housing design for multiple seal housings of the assembly. As seen in FIG. 6, vent port 132 is in communication with the space between the two outermost seals and serves to collect any residual process gas that may have leaked past the first four seals, so that it can be safely collected or destroyed without reaching the atmosphere.

Figure 7:
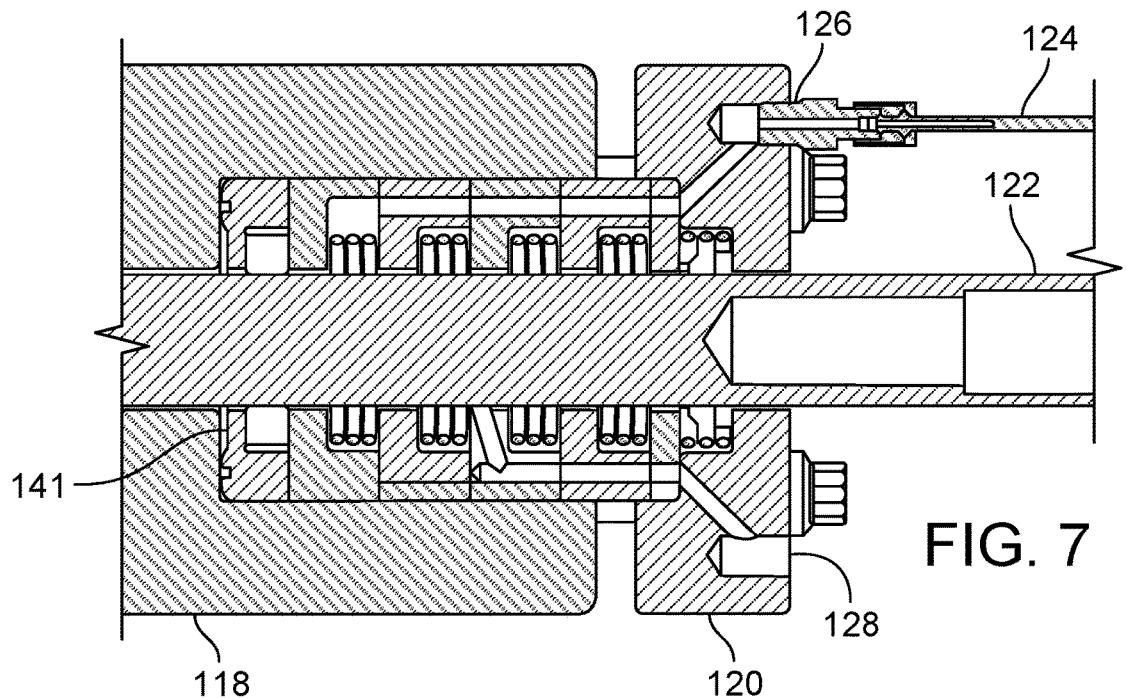
FIG. 7 is a cross-sectional view, taken along line 7-7 in FIG. 3
Figure 8:
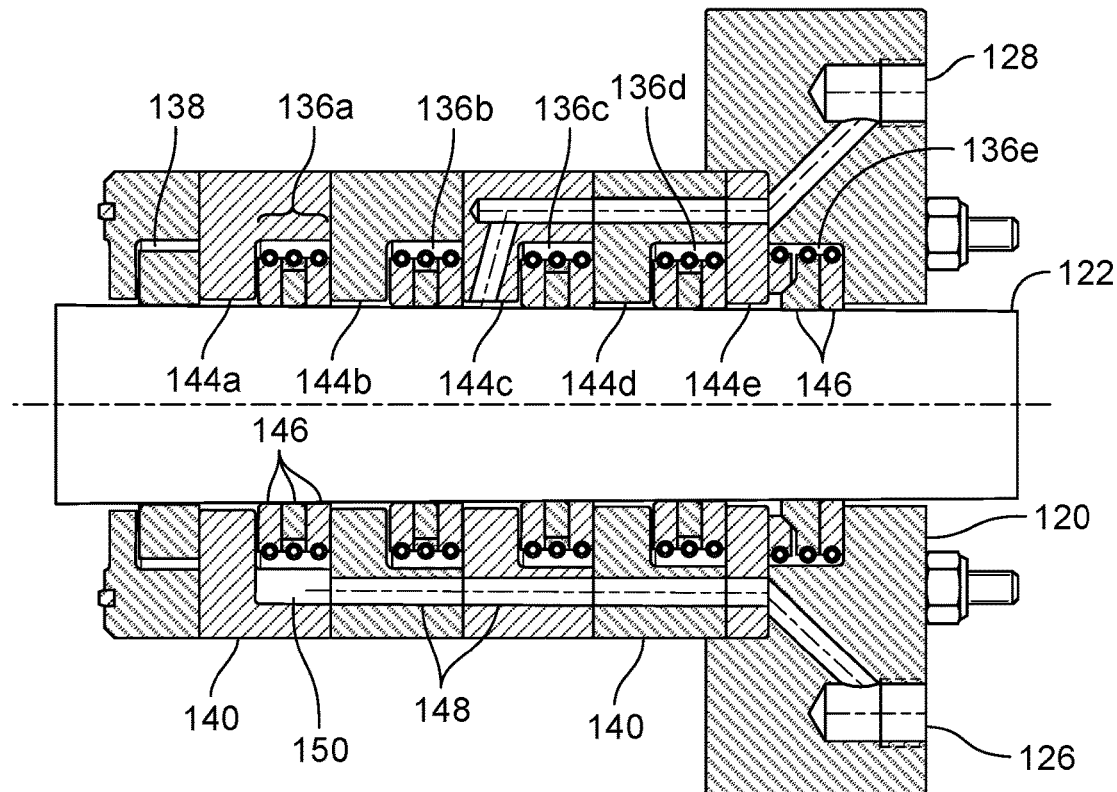
FIG. 8 is an enlarged cross-sectional view of the multistage sealing system, taken along line 8-8 in FIG. 3.

Referring next to FIGS. 7 and 8, the multistage sealing system defines pressure spaces along the shaft surface, bounded by the various seals. Moving from the high pressure end of the sealing system to the atmospheric pressure end, high pressure process gas leaking past the pressure breaking rod ring first reaches intermediate pressure space 144a between pressure breaking rod ring 138 and the first seal 136a, which consists of three stacked sealing elements or rod rings 146. It is this pressure space 144a to which the pressure equalization port 126 communicates, feeding some of the leaked process gas that enters this first space back to the low pressure inlet of the compressor. This porting of gas from pressure space 144a back to the compressor inlet at, for example, 800 psig, may result in an operating pressure within space 144a of only 800 psig. In other words, there may be a pressure differential across the first seal (the pressure breaking rod ring 138) of about 700 psig, or between 40 and 60 percent of the overall pressure differential across the multistage sealing system. Process gas leaking from intermediate pressure space 144a past seal 136a enters pressure space 144b at a pressure of, for example, about 600 psig. Further leakage past seal 136b reaches pressure space 144c, which may be at a pressure, for example, of about 500 psig. As shown in these cross-sections, purge gas port 128 communicates with pressure space 144c, which is the same space with which the lube port communicates. Thus, in operation the multistage sealing system defines a series of pressure spaces at progressively decreasing pressures along the shaft, with each seal creating a differential pressure between two pressure spaces. The amount of running leakage past a seal, and the pressure differential across the seal, are interrelated. In general, the higher the pressure differential across a seal, the greater the running friction of the seal and the greater the heat generation at the seal. As noted above, equalizing the pressure at pressure space 144a via pressure equalization port 126 results in a pressure profile of 1500-800-600-500-200-50-0 psig along the multistage sealing system. Without such pressure equalization, the pressure profile at similar operating conditions may be 1500-1200-1000-600-250-50-0 psig. The pressure equalization provided via pressure equalization port 126 can also reduce pressure pulsations within the sealing system.

In some cases, purge gas (e.g., an inert gas such as nitrogen) is introduced to pressure space 144c at a pressure higher than the pressure in pressure space 144b, to cause any leakage at seal 136b to move toward the compressor. In such a case the pressure profile may be 1500-800-600-620-400-200-0 psig, and the gas ported back to the compressor inlet may be a mixture of the process gas and the purge gas. In some cases the purge gas port is omitted. In some cases both the purge gas port and the vent are omitted.

Figure 9:
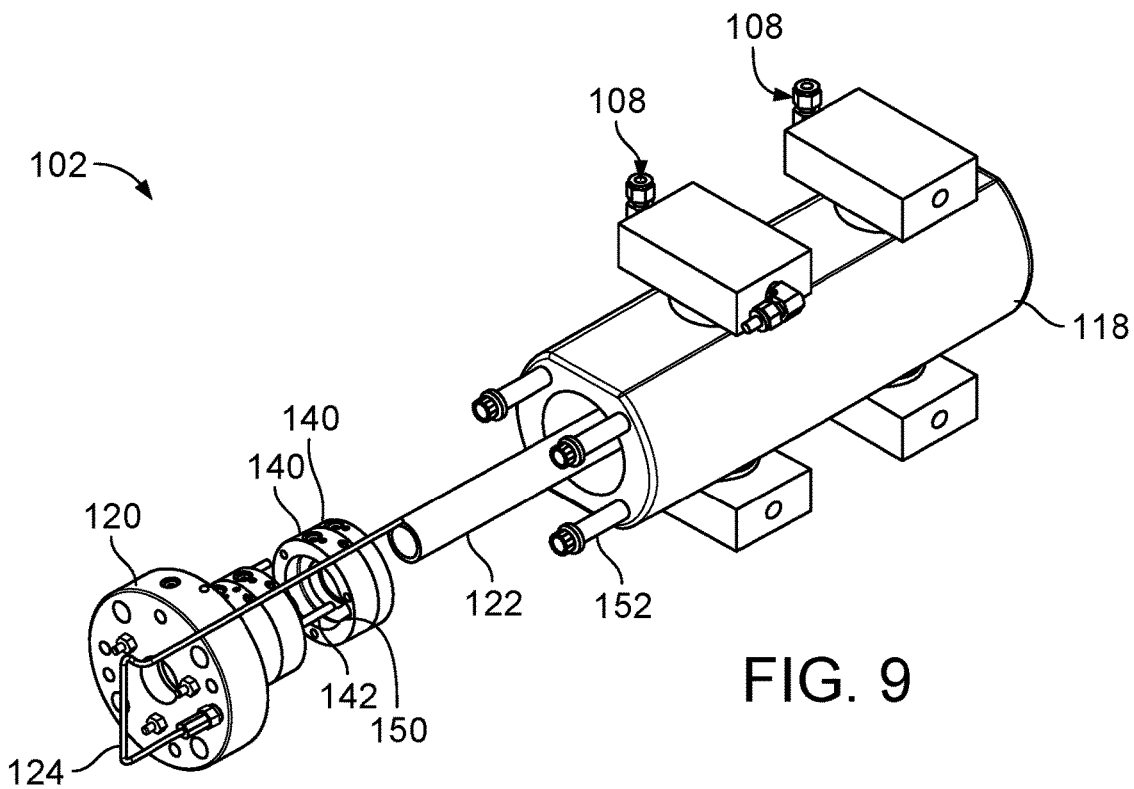
FIG. 9 is an exploded view of the compressor portion of FIG. 2.

As seen best in FIG. 8, hydraulic communication between pressure equalization port 126 and space 144a (exposed to the shaft surface) is via aligned channels 148 in the stacked seal housings 140, leading to a recess 150 behind seal 136a. This recess is open to pressure space 136a at the leading edge of the seal. The recess and aligned channels 148 form portions of the flow path (116 in FIG. 1) back to the compressor inlet. The flow from pressure space 144a back to the compressor inlet may be controlled, either passively by an orifice along the flow path or actively by a valve controlled as a function of a pressure signal to maintain a desired running pressure in pressure space 144a. In such cases pressure space 144a will be at a somewhat higher pressure than the compressor inlet, but still a lower pressure than without any pressure equalization. It should be noted that while pressure equalization port 126 is shown communicating with pressure space 144a between pressure breaking rod ring 138 and seal 136a, it could alternatively communicate with pressure space 144b between seals 136a and 136b, in which case the pressure profile may be 1500-1200-800-600-400-200-0 psig Referring next to FIG. 9, end plate 120 and its connected stack of seal housings 140, aligned and held together by tie rods 142, is inserted into the bore of compressor housing 118 and held in place by housing bolts 152.

Figure 10:
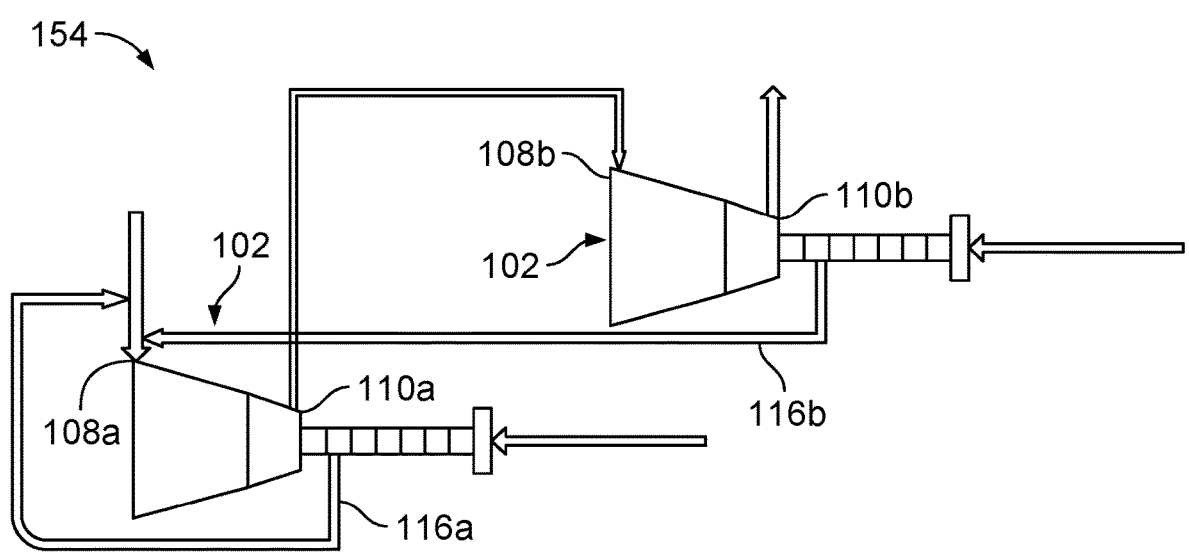
FIG. 10 schematically represents a multistage gas processing system with two compressors, each having a multistage sealing system.

Referring to FIG. 10, for some applications compressors 102 may be coupled in series to create higher working pressures. In this example, multistage compression system 154 consists of two compressors 102 coupled in series, such that the output 110a of the first compression stage feeds the input 108b of the second stage. The first compression stage is as discussed above, with flow path 116a feeding gas from a designated space between seals in the first multistage sealing system back to compressor inlet 108a. In system 154, a flow path 116b feeds gas from a designated space between seals in the second multistage sealing system, also to the inlet 108a of the first stage compressor. Path 116b may be throttled as necessary to provide the desired pressure profile for the second compression stage, given that the pressure at output 110b is significantly greater than the pressure at output 110a.

The above systems have been described with respect to a reciprocating compressor, in which shaft power does work on the process gas to create a high pressure gas flow that can be put to work elsewhere in the system. The same sealing principles can be applied to a linear reciprocating gas engine that uses a high pressure flow of gas to drive a shaft back and forth in a reciprocating manner.

Figure 11:
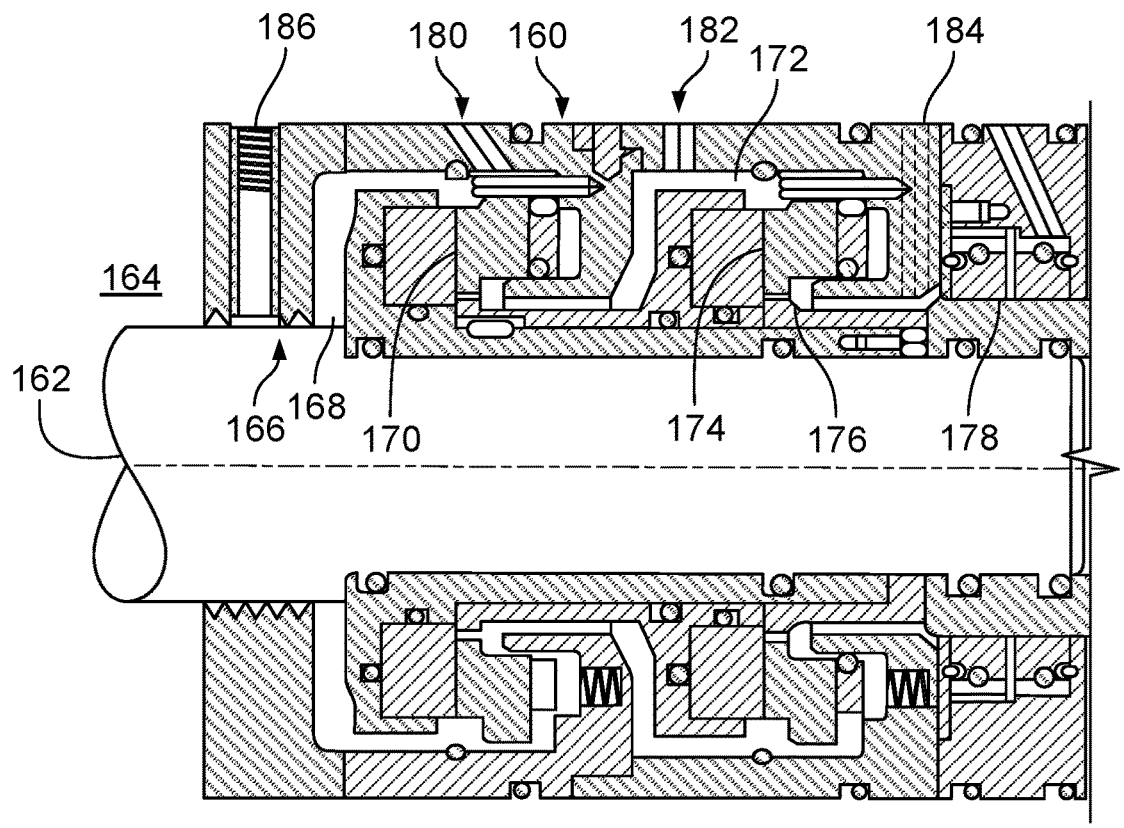
FIG. 11 is a cross-sectional view of a rotary multistage sealing system with integrated pressure equalization.

The same pressure equalization principle may also be employed in a rotary shaft sealing system. Referring to FIG. 11, rotary multistage shaft sealing system 160 is employed to seal a rotating shaft 162 extending from a high pressure vessel (not shown), with the left end of the sealing system exposed to the high vessel pressure 164. At the high pressure end of the sealing system, a labyrinth seal 166 engages the seal at multiple points along its length, effectively reducing the pressure progressively along the width of the labyrinth between the high vessel pressure and a first pressure space 168. A first stage sliding seal interface 170 separates pressure space 168 from a second pressure space 172. A second stage sliding seal interface 174 separates pressure space 172 from a third pressure space 176, which is exposed to shaft seals 178 at the low pressure end of the sealing system. A purge gas port 180 allows a pressurized purge gas, such as nitrogen, to be delivered to first pressure space 168, and vent port 182 allows a mixture of leaked process gas and purge gas to be removed from the system for collection or disposal/destruction. An optional secondary vent port 184 allows residual gas to be vented from pressure space 176. Pressure equalization is provided by connecting equalization pressure port 186 to the low pressure (input) side of the compressor, as discussed above. Such a connection effectively increases the pressure reduction along the labyrinth seal, lowering the pressure in pressure space 168, thereby lowering the pressure differential that must be maintained by the sliding seal interfaces 170 and 174.

Figure 12:
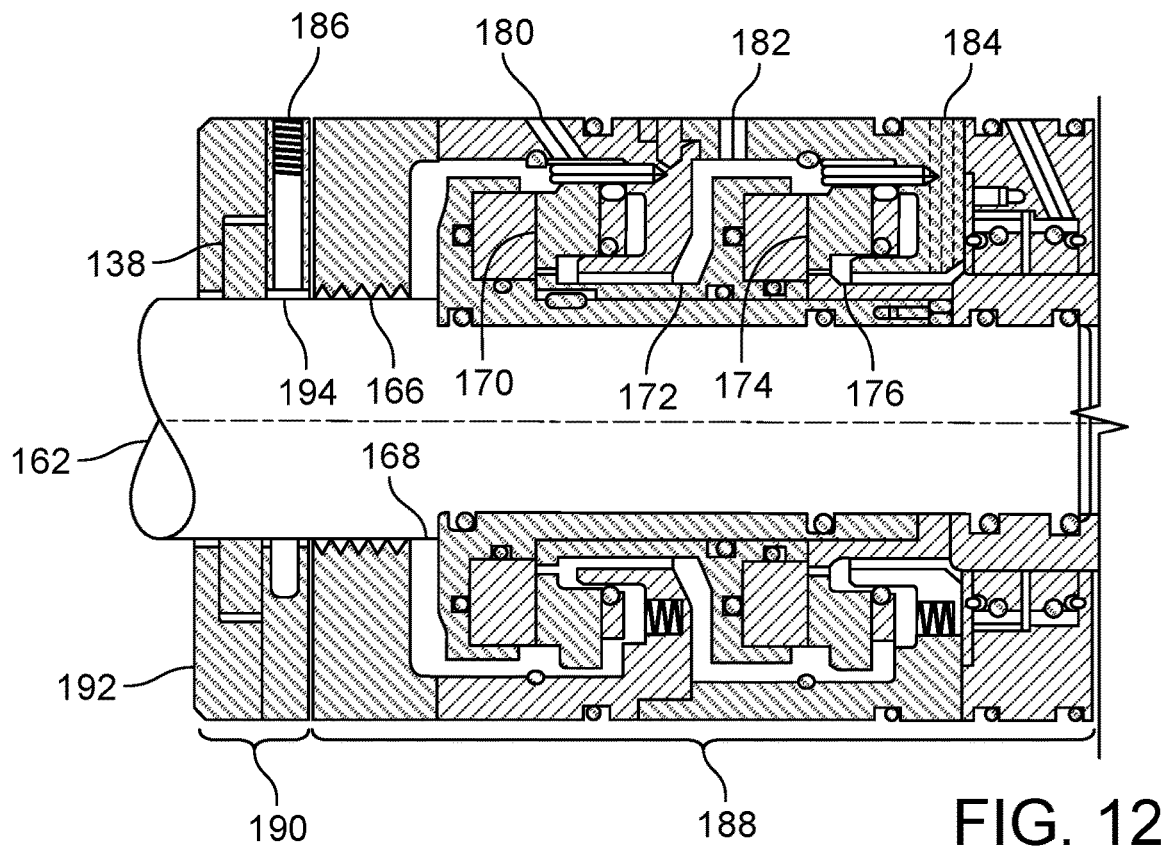
FIG. 12 is a cross-sectional view of a rotary multistage sealing system adapted to add pressure equalization.

In the above-described examples, the pressure equalization port and associated channels have been integrated into the sealing system. However, the principles discussed above can be applied to existing multistage sealing systems by providing appropriate retrofit hardware. For example, the system shown in FIG. 12 includes a typical rotary shaft multistage sealing system 188 and a pressure equalization adaptor 190 bolted or otherwise affixed at the high pressure end of the sealing system about the shaft 162. Adaptor 190 includes an adaptor housing 192 configured to be mechanically fixed to the existing sealing system housing, and includes a pressure breaking rod ring 138 and defines the pressure equalization port. In the example shown, the adaptor housing is a stack of two plates, one defining the pressure equalization port and the other accommodating the rod ring. With the adaptor mounted to the pre-existing sealing system a new pressure space 194 is defined between the pressure breaking rod ring 138 and the labyrinth seal 166. Thus, the pressure in pressure space 194 is moderated by the pressure equalization system, reducing the pressure at the high pressure side of the labyrinth seal.

Figure 13:
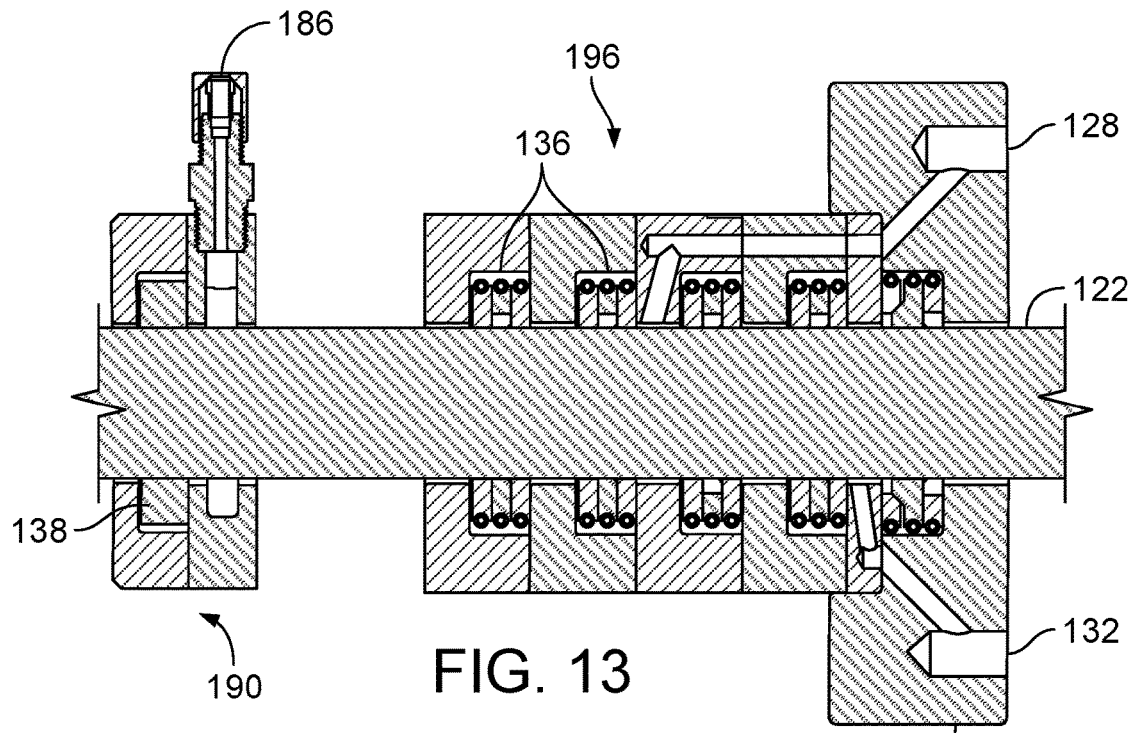
FIG. 13 is a cross-sectional view of a standard multistage sealing system for a reciprocating shaft and an adaptor for adding pressure equalization.
Figure 14:
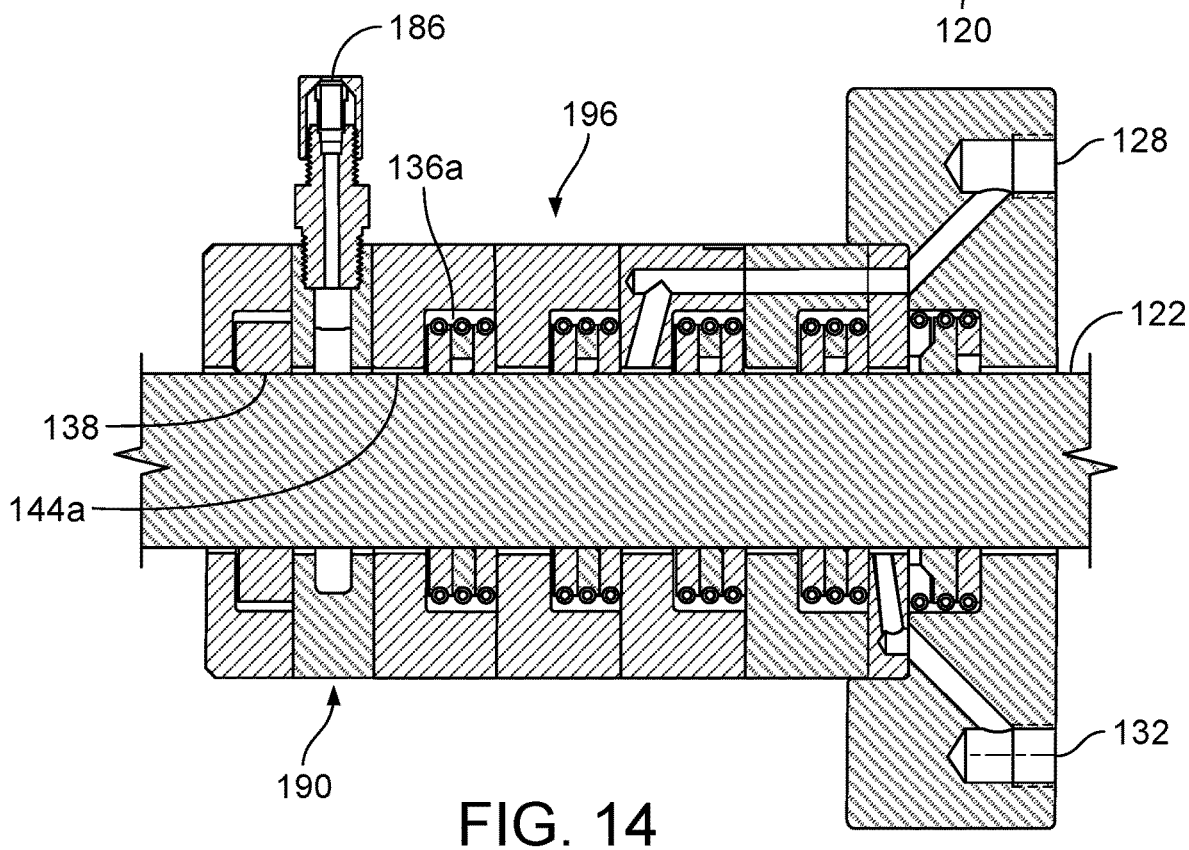
FIG. 14 shows the sealing system and adaptor of FIG. 13 coupled together to form a sealing system with pressure equalization.

Referring next to FIGS. 13 and 14, an existing multistage sealing system 196 for a reciprocating shaft compressor may be modified to provide the above-described pressure equalization benefits by adding a bolt-on adaptor 190 as described above. As assembled, the modified multistage sealing system (FIG. 14) defines a new pressure space 144a between pressure breaking rod seal 138 and seal 136a, and port 186 provides communication between this new pressure space 144a and an inlet of the associated compressor. The modified system functions in similar manner to the system described above with respect to FIG. 8.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A gas compressor system comprising:
   a compressor cylinder defining a cavity for processing a gas and comprising a compressor cylinder gas inlet for accepting process gas into the cavity at an input pressure, and a compressor cylinder gas outlet for discharging process gas from the cavity at an output pressure that is higher than the input pressure;
   a reciprocating shaft coupled to the compressor cylinder and configured to transfer mechanical energy to gas in the compressor cylinder; and
   a progressive sealing system that defines an intermediate pressure space between adjacent seals spaced along the reciprocating shaft between the cavity and atmosphere, wherein the intermediate pressure space is in fluid communication with the compressor cylinder gas inlet via a flow line spaced from the reciprocating shaft such that process gas leaked from the compression cylinder into the intermediate pressure space is ported back to the compressor cylinder gas inlet, and wherein the gas compressor system is configured such that in operation, maximum pressure in the intermediate pressure space is lower than the output pressure, and higher than atmospheric pressure.

2. The gas compressor system of claim 1, wherein the sealing system defines multiple pressure spaces between adjacent seals spaced along the reciprocating shaft, including the intermediate pressure space and a second space that in operation reaches a maximum pressure lower than a maximum pressure in the intermediate pressure space and higher than atmospheric pressure.

3. The gas compressor system of claim 2, further comprising a purge gas source in fluid communication with the second pressure space and under sufficient pressure to cause purge gas to flow from the purge gas source into the sealing system and along the reciprocating shaft away from the compressor cylinder.

4. The gas processing system of claim 3, wherein the multiple pressure spaces include a vent pressure space in fluid communication with a vent for venting at least some of the purge gas.

5. The gas compressor system of claim 2, wherein the sealing system comprises a series of four seals defining three pressure spaces.

6. The gas compressor system of claim 2, wherein the multiple pressure spaces include a pressure space in fluid communication with a pressurized source of lubricant.

7. The gas compressor system of claim 1, wherein the intermediate pressure space is in direct fluid communication with the compressor cylinder gas inlet.

8. The gas processing system of claim 1, configured such that in operation, pressure in the intermediate pressure space is maintained within 30 percent of the input pressure.

9. The gas compressor system of claim 1, wherein the flow line is the only inlet or outlet into or out of the intermediate pressure space in operation, other than along a surface of the reciprocating shaft.

10. The gas compressor system of claim 1, wherein the shaft rotates with respect to the compressor cylinder, during transfer of energy between the reciprocating shaft and process gas within the compressor cylinder, the shaft rotating within the sealing system.

11. The gas compressor system of claim 10, wherein the adjacent seals are adjacent portions of a continuous labyrinth seal, the intermediate pressure space being an intermediate portion of a labyrinth flow path through the seal.

12. The gas compressor system of claim 11, wherein the flow path defines a throttling orifice.

13. The gas compressor system of claim 12, wherein the throttling orifice is adjustable and/or controllable.

14. The gas compressor system of claim 1, wherein the flow path defines a one-way valve that restricts flow along the flow path toward the intermediate pressure space.

15. The gas compressor system of claim 1, wherein each of the seals is mounted in a respective one of a plurality of seal housings coupled together along the reciprocating shaft.

16. The gas compressor system of claim 15, wherein the flow line is defined in part by aligned apertures in multiple seal housings.

17. The gas compressor system of claim 1, wherein the compressor cylinder, the reciprocating shaft and the sealing system are components of a first gas compression stage, the gas compressor system further comprising a second gas compression stage having a second compressor cylinder, a second shaft and a second multistage sealing system, the first and second gas compression stages connected such that the output of the first gas compression stage is connected to an input of the second gas compression stage, and wherein the second multistage sealing system defines a second intermediate pressure space in fluid communication with the compressor cylinder gas inlet of the compressor cylinder of the first gas compression stage via a second flow line.

18. A method of modifying a progressive sealing system having a series of seals held in a stack of seal housings aligned to accept a reciprocating shaft therethrough, the method comprising:

placing a port housing against a distal face of the stack of seal housings, the port housing defining a central aperture sized to accommodate the reciprocating shaft, and a port in fluid communication with the central aperture, the port housing accommodating an end seal configured to restrict flow along the reciprocating shaft with the progressive sealing system installed, with the end seal and a nearest one of the seals of the series of seals defining therebetween an intermediate pressure space in fluid communication with the port; and during installation to a compressor cylinder, of a gas compressor system, connecting the port to a compressor cylinder gas inlet of the gas compressor system such that, during operation, process gas leaked from the compression cylinder into the intermediate pressure space is ported back to the compressor cylinder gas inlet.

19. The method of claim 18, wherein the port housing comprises two separable housing portions, including a first portion defining the central aperture and a second portion containing the end seal.

20. The method of claim 18, wherein the end seal is a labyrinth seal.

21. A method of sealing a reciprocating shaft that reciprocates in a gas compressor cylinder having a compressor cylinder gas outlet and a compressor cylinder gas inlet operating at differing pressures, the method comprising:

positioning multiple seals along the reciprocating shaft, the seals defining at least one intermediate pressure space between adjacent seals;

during operation of the gas compressor cylinder, routing process gas leaked from the gas compressor cylinder into the intermediate pressure space directly back to an compressor cylinder gas inlet of the gas processing compressor cylinder, the routed process gas flowing as a result of a pressure differential between the intermediate pressure space and the compressor cylinder gas inlet such that process gas leaked from the compression cylinder into the intermediate pressure space is ported back to the compressor cylinder gas inlet.

* * * * *